United States Patent [19]

McBride et al.

[11] 4,246,229
[45] Jan. 20, 1981

[54] STARTING DEVICE FOR A CHEMICAL OXYGEN GENERATOR

[75] Inventors: William S. McBride, Lübeck; Gerd Pantaleon-Stemberg, Mölln, both of Fed. Rep. of Germany

[73] Assignee: Drägerwerk Aktiengesellschaft, Fed. Rep. of Germany

[21] Appl. No.: 30,938

[22] Filed: Apr. 17, 1979

[30] Foreign Application Priority Data

Apr. 26, 1978 [DE] Fed. Rep. of Germany ....... 2818250

[51] Int. Cl.³ ............................ A62B 7/08; B01J 1/00; A62B 7/04
[52] U.S. Cl. .................................. 422/122; 422/126; 422/165; 128/202.26
[58] Field of Search ............... 422/120, 122, 123, 125, 422/126, 165, 198, 149, 193; 128/142.2, 142.3, 141 R, 203; 102/205

[56] References Cited

U.S. PATENT DOCUMENTS

| 2,114,142 | 4/1938 | Hloch .................................... 422/126 |
| 3,356,492 | 12/1967 | Delange et al. ....................... 422/165 |
| 3,558,285 | 1/1971 | Ciccone et al. ....................... 422/165 |
| 3,620,683 | 11/1971 | Hwoschinsky et al. ............. 422/126 |
| 3,806,323 | 4/1974 | Thompson ........................... 422/122 |
| 3,955,931 | 5/1976 | Thompson ........................... 422/165 |

FOREIGN PATENT DOCUMENTS 450445  3/1913  France ....................... 102/205

Primary Examiner—S. Leon Bashore
Assistant Examiner—Chris Konkol
Attorney, Agent, or Firm—McGlew and Tuttle

[57] ABSTRACT

A starting device for a chemical oxygen generator comprises a casing which has a chemical oxygen generating material therein and with a first wall above the material with an opening bounded by an annular sealing face and an opposite second wall below the oxygen generating material with at least one passage for the passage therethrough of an oxygen which is generated. A liquid ampule is disposed above the oxygen generating material and a thrust bolt is mounted in the opening of the casing over the liquid ampule and is movable when actuated from a starting position overlying and spaced from the ampule to an actuated position in which it penetrates and breaks the ampule. The coil spring is associated with the bolt and it biases the bolt in a direction toward the ampule. A sealing ring is disposed around the bolt and is located initially above the opening and moves with the bolt to engage into the opening and seal the top of the container when the bolt is in the actuated position.

5 Claims, 1 Drawing Figure

U.S. Patent  Jan. 20, 1981  4,246,229
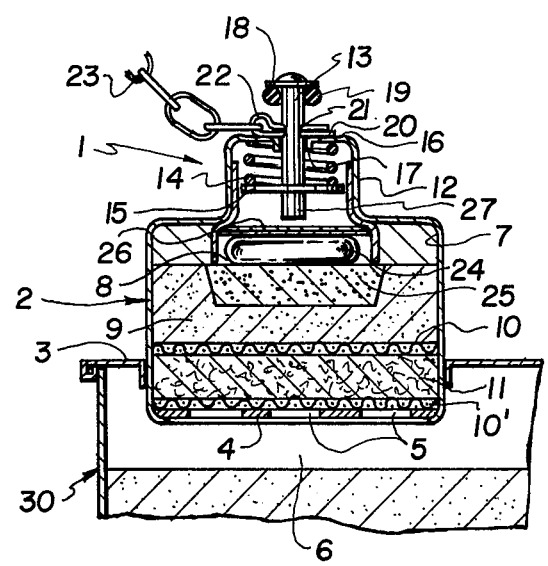

STARTING DEVICE FOR A CHEMICAL OXYGEN GENERATOR

FIELD AND BACKGROUND OF THE INVENTION

This invention relates in general to an oxygen generating device and in particular to a new and useful starting device for a chemical oxygen generator which comprises a bolt which moves to break a liquid ampule to cause the liquid to initiate exothermic reactions on an oxygen generating material so as to produce oxygen therefrom.

DESCRIPTION OF THE PRIOR ART

In chemical breathing apparatus based on the circulation principle, the $CO_2$ from the breathing air is fixed and the oxygen is supplied by a $KO_2$ cartridge. The $KO_2$ cartridge is activated by the $CO_2$ and the moisture contained in the exhaled air. The cartridge takes on the task of fixing the $CO_2$ and supplying the oxygen as a function of the user's physical strain. Up to the activating of the $KO_2$ cartridge, the oxygen is supplied by an oxygen generator such as a chlorate cartridge. At that time the produced oxygen is supplied to the user directly. The starting device starts the oxygen delivery upon actuation by hand or by a mechanism.

A known chemical oxygen generator accommodated in a casing having an outlet opening for the developed oxygen, contains within the casing, a chlorate candle, an ignition mixture which is dissolvable by water and disposed at the candle, and a breakable ampule filled with water, as well as a pointed pin which is introduced from the outside through the cover and extends close to the ampule. On the outside, the generator is provided with a push button. Upon pressing the pin inwardly by the movement of the push button into the generator, the tip of the pin breaks the ampule. The water flowing out from the ampule renders active the ignition mixture and thereby the chlorate candle.

The design of this prior art starting device in which the chlorate candle and the starting mechanism form, in practice, a single component part does not prevent an unintentional pushing in of the pin. A part of the developed oxygen may escape directly at this location because no sealing is provided between the pin and the cover. Precious breathing gas is thus lost. (U.S. Pat. No. 3,806,323).

Further known is a canister with an oxygen generator (chlorate candle) which is activated by a starting device comprising a release mechanism which is held up by a snap-action closure on the cover, and an ignition part. The release mechanism comprises an elongated pin which terminates in a head with a tip, while its other end is designed as a knob which is pressed by a helical spring toward an upper abutment. Below the tip at the other end of the pin, already in the upper part of the canister, an ignition part is provided. It is an ampule filled with water and disposed above the ignition cone. A sealing ring provides a gastight connection between the canister and the release mechanism. To start the device, the knob of the pin is pressed into the device until the tip of the pin breaks the ampule so that water can moisten the ignition cone which, in turn, activates the chlorate candle so that oxygen is produced. This design of oxygen generators again does not comprise a sealing at the location where the pin extends through the casing, so that a part of the oxygen may escape in an uncontrolled manner. The starting mechanism is subdivided into the removable release mechanism and the ignition part, with the water ampule and the igniton cone accommodated in the canister. A separate use of the starting device for oxygen supply is not possible (German Offenlegungsschrift No. 26 05 173).

SUMMARY OF THE INVENTION

The invention is directed to a starting device designed as a part of a chemical oxygen generator which forms a separate constructional unit delivering oxygen, and in the mechanical system of which any gas loss is prevented.

Accordingly it is an object of the invention to provide a starting device for a chemical oxygen generator which comprises a casing which has an oxygen generating material therein and has a first wall above the oxygen generating material with an opening bounded by an annular sealing face and an opposite second wall below the oxygen generating material with at least one passage therethrough for oxygen which is generated, and further including a liquid ampule disposed over the oxygen generating material and a thrust bolt mounted for movement upwardly and downwardly in the opening overlying the ampule and being movable when actuated from a starting position overlying and spaced from the ampule to an actuated position in which it penetrates and breaks the ampule, further including spring means biasing the thrust bolt in a direction toward the ampule and a sealing ring disposed around the thrust bolt located initially above the opening and being affixed to the bolt so that it moves therewith and engages in the opening and seals the casing when the bolt is in an actuated position.

A further object of the invention is to provide a starting device for a chemical oxygen generator which is simple in design, rugged in construction and economical to manufacture.

The advantage obtained with the invention are, in particular, that the simple and secure sealing of the thrust bolt in the opening of the top wall of the casing is obtained, in practice, with already known component parts which are also needed for other purposes, so that no complicated design is necessary. In spite of the old need of a sealing preventing losses of oxygen, this simple solution has not been found as yet. The starting device, in a common casing with the chemical oxygen generator, represents a simple oxygen supply device for specific applications. Further features of the invention follow from the dependent claims They confirm the advantageously simple design of the device.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the Drawings:

The only FIGURE of the drawings is a partial schematic sectional view of a breathing apparatus having an oxygen generator with a starting device constructed in accordance with the invention.

DESCRIPTION OF THE PREFERRED EMBODIMENT

Referring to the drawings in particular, the invention embodied therein comprises a starting device as a part of a chemical oxygen generator which comprises a thrust bolt 13 which is mounted for upward and downward movement in a top wall 16 of a casing 7 containing a sodium chromate or other similar chemical oxygen generator.

The FIGURE shows an arrangement of a starting device generally designated 1, as part of a chemical oxygen generator generally designated 2 and arranged on the cover 3 of a $KO_2$ cartridge. In the bottom 4 of the casing of oxygen generator 2, openings 5 are provided through which the oxygen flows into the interior 6 of the $KO_2$ cartridge generally designated 30.

Oxygen generator 2 accommodates, in the upper part of its casing 7, the starting device 1, subjacent thereto the ignition device 8, and the sodium chlorate layer 9 thermally connected thereto. Below this layer 9 and between screens 10 and 10' there is a filtering material 11 in which the developed oxygen is purified.

The starting device 1 extends into and through a dome 12 forming the upper portion of casing 7. The device comprises a thrust bolt 13 which is biased inwardly (downwardly) by a helical spring 14 clamped between an abutment 15 affixed to the helical spring 14 and the top wall 16 of the dome 12. The upper portion of thrust bolt 13 projects through an opening 17 provided in the top wall 16 of dome 12 to the outside. An abutment 18 is provided on the top or outer end of the bolt 13 for a sealing ring 19 which is secured to the bolt.

Thus, the sealing ring 19 is disposed opposite to that portion of top wall 16 of the dome which is formed as a sealing face 20 around opening 17. Between the abutment 18 and the ring 19, the thrust bolt 13 is provided with a bore 21 for receiving a locking element 22 designed as a cotter pin. Locking element 22 is connected to casing 7 through a small chain 23. The ignition device 8 is disposed below dome 12 and comprises a liquid ampule 24 and an ignition cone 25 which is thermally connected to a sodium chlorate layer 9.

A foil 26 provided above liquid ampule 24 closes the interior of the casing 7 therebelow which contains the ignition cone 25 and the sodium chlorate layer 9.

To start the operation, locking element 22 is pulled out from thrust bolt 13 by means of the chain 23. Helical spring 14, while expanding, moves thrust bolt 13 into the casing 7. A lower end 27 of the thrust bolt perforates foil 26 and impinges on liquid ampule 24 which is thereby broken. Due to the moistening of ignition cone 25 by the escaping liquid, an exothermal reaction is initiated within sodium chlorate layer 9 to generate oxygen. The developing oxygen, after being purified by filtering material 11, leaves casing 7 through outlet openings 5.

The axial motion of thrust bolt 13 caused by helical spring 14 terminates, after the liquid ampule 24 has been broken, in a tight abutting of sealing ring 19 on sealing face 20. By the still present pressure of helical spring 14 the sealing between thrust bolt 13 and opening 17 is secured. This prevents the oxygen from escaping.

If the chemical oxygen generator with the inventive starting device is used separately, thus not in connection with a $KO_2$ cartridge, prior to starting the operation, the outlet openings 5 are closed for example by a plug or a foil. The outlet openings 5 may also be provided at other locations of the wall 4 of casing 7 so that the oxygen may flow into a breathing air passage 6 of the canister 30.

While a specific embodiment of the invention has been shown and described in detail to illustrate the application of the principles of the invention, it will be understood that the invention may be embodied otherwise without departing from such principles.

What is claimed is:

1. A starting device for a chemical oxygen generator, comprising a casing having chemical oxygen generating material therein and a first wall above the material with an opening bounded by an annular sealing face and an opposite second wall below said oxygen generating material with at least one passage there through for oxygen which is generated, a liquid ampule disposed over said oxygen generating material, a thrust bolt mounted in the opening of said casing over said ampule and being movable when actuated from a starting position overlying and spaced from said ampule to an actuated position in which it penetrates an ampule and breaks the ampule to release the liquid therein, spring means biasing said thrust bolt in a direction toward said ampule, locking means for locking said thrust bolt against movement by said spring means, and a sealing ring disposed around said thrust bolt above the opening and being affixed to said thrust bolt for movement therewith and being engageable with the sealing face surrounding the opening when said ring is in an actuated postition so as to seal said casing.

2. A starting device according to claim 1, including an abutment defined on said thrust bolt against which the top of said sealing ring abuts, a second ring on said thrust bolt disposed in said casing below the opening, said spring means comprising a helical spring engaged around said bolt and supported on said second ring and biased against the first wall of said housing, said thrust bolt having a bore therethrough and said locking means comprising a locking pin engageable through the bore of said thrust bolt to hold it in a starting position.

3. A starting device according to claim 1, wherein said casing includes a dome-shaped portion having a top forming said first wall.

4. A starting device according to claim 1, wherein said casing includes a top wall defining said first wall with a dome-shaped central portion, said spring means comprising a helical spring disposed around said thrust bolt located in said dome-shaped portion and having one end bearing against the top of said dome-shaped portion, said bolt carrying an abutment member affixed thereto located below said spring and biased by said spring in a direction toward said ampule.

5. A starting device according to claim 1, further including a sealing foil connected to said casing over said liquid ampule and beneath said thrust bolt when said thrust bolt is locked by said locking means against movement by said spring means, whereby said thrust bolt penetrates said foil and said ampule when said thrust bolt moves into said actuated position.

* * * * *